United States Patent
Rakshit et al.

(10) Patent No.: US 11,269,356 B2
(45) Date of Patent: Mar. 8, 2022

(54) EDGE COMPUTING FOR CLUSTERS OF VEHICLES

(71) Applicant: KYNDRYL, INC., New York, NY (US)

(72) Inventors: Sarbajit K. Rakshit, Kolkata (IN); Kuntal Dey, Vasant Kunj (IN); Sougata Mukherjea, New Delhi (IN); Pramod Vadayadiyil Raveendran, Bengaluru (IN)

(73) Assignee: KYNDRYL, INC., New York, NY (US)

( * ) Notice: Subject to any disclaimer, the term of this patent is extended or adjusted under 35 U.S.C. 154(b) by 145 days.

(21) Appl. No.: 16/597,916

(22) Filed: Oct. 10, 2019

(65) Prior Publication Data
US 2021/0109544 A1 Apr. 15, 2021

(51) Int. Cl.
*G05D 1/02* (2020.01)

(52) U.S. Cl.
CPC ......... *G05D 1/0287* (2013.01); *G05D 1/0276* (2013.01); *G05D 2201/0213* (2013.01)

(58) Field of Classification Search
CPC .............. G05D 1/0287; G05D 1/0276; G05D 2201/0213; G05D 1/0297
See application file for complete search history.

(56) References Cited

U.S. PATENT DOCUMENTS

| | | | |
|---|---|---|---|
| 9,523,984 B1 | 12/2016 | Herbach | |
| 2015/0331422 A1 | 11/2015 | Hartung | |
| 2016/0018822 A1 | 1/2016 | Nevdahs | |
| 2018/0176930 A1 | 6/2018 | Welsch | |
| 2018/0190016 A1 | 7/2018 | Yang | |
| 2019/0011931 A1 | 1/2019 | Selvam | |
| 2019/0025818 A1 | 1/2019 | Mattingly | |
| 2019/0025819 A1 | 1/2019 | Ferguson | |
| 2019/0213272 A1* | 7/2019 | Wong | G06F 16/29 |
| 2020/0286387 A1* | 9/2020 | Zhou | G08G 1/0175 |

FOREIGN PATENT DOCUMENTS

| | | |
|---|---|---|
| CN | 108260092 A | 7/2018 |
| KR | 20170082165 A | 7/2017 |

OTHER PUBLICATIONS

"What is Edge Computing?" By GE Digital. Jul. 5, 2018 WayBack Machine, https://web.archive.org/web/20180705175453/https://www.ge.com/digital/blog/what-edge-computing. Five pages.
Mell et al., "The NIST Definition of Cloud Computing", National Institute of Standards and Technology, Special Publication 800-145, Sep. 2011, 7 pages.

* cited by examiner

*Primary Examiner* — Rodney A Butler
(74) *Attorney, Agent, or Firm* — Erik Swanson; Andrew M. Calderon; Roberts Calderon Safran & Cole P.C.

(57) ABSTRACT

Autonomous vehicle communications are managed by assigning vehicle clusters to process collected data as a unified cluster, whether transmitting the data to a remote server or processing the data by an assigned vehicle within the cluster. Efficient travel guidance is produced in a timely manner by reducing the network bandwidth usage and volume of data transferred by autonomous vehicles traveling on a roadway with other autonomous vehicles.

20 Claims, 8 Drawing Sheets

EDGE COMPUTING FOR CLUSTERS OF VEHICLES

BACKGROUND

The present invention relates generally to the field of travel guidance for autonomous vehicles, particularly when traveling on roadways with other autonomous vehicles.

Edge computing is rapidly becoming a key part of the Industrial Internet of Things (IIoT) to accelerate a digital transformation of business. Several trends in edge computing have come together to create an opportunity to help industrial organizations turn massive amounts of machine-based data into actionable intelligence closer to the source of the data. In the context of IIoT, the term "edge" refers to the computing infrastructure that exists close to the sources of data, for example, industrial machines such as wind turbines, magnetic resonance scanners, undersea blowout preventers, industrial controllers, and time series databases aggregating data from a variety of equipment and sensors. These edge computing devices typically reside away from the centralized computing available in a cloud computing environment. Edge computing systems increasingly offer compute, storage, and analytic power to consume and act upon data at the machine location.

An autonomous vehicle, also referred to as self-driving, driverless, or robotic, is a vehicle that is capable of sensing and/or detecting a physical environment by collection and processing of environmental data and capable of moving through the physical environment with little or no human input. The environmental data is collected from a variety of sensors and detection systems, such as radar, lidar, GPS (global positioning system), motion sensors, ultrasound sensors, video cameras, and inertial measurement units. Advanced control systems interpret sensory information collected by the vehicle sensors to identify, for example, navigation paths, obstacles, and relevant signage.

SUMMARY

According to an aspect of the present invention, there is a method, computer program product, and/or system instruct a set of vehicles to take driving actions that performs the following operations (not necessarily in the following order): (i) assigning a set of vehicles to a travel cluster, the set of vehicles traveling along a common trajectory; (ii) assigning a data collection task to a first vehicle in the travel cluster, the data collection task being to: (a) collect a first set of data from a set of sensors of the first vehicle and (b) transmit the first set of data to a second vehicle; (iii) collecting, by the second vehicle, a second set of data from onboard sensors of the second vehicle; (iv) combining the first set of data with the second set of data to create a travel dataset; (v) performing analysis on the travel dataset to generate driving instructions; and (vi) instructing vehicles in the travel cluster, including the first vehicle and the second vehicle, to operate according to the driving instructions.

According to another aspect of the present invention, the above-mentioned method, computer program product, and/or system performs the above-mentioned operations where the first vehicle is an autonomous vehicle and the set of sensors of the first vehicle generate data used by the first vehicle to travel the common trajectory.

DETAILED DESCRIPTION

Autonomous vehicle communications are managed by assigning vehicle clusters to process collected data as a unified cluster, whether transmitting the data to a remote server or processing the data by an assigned vehicle within the cluster. Efficient travel guidance is produced in a timely manner by reducing the network bandwidth usage and volume of data transferred by autonomous vehicles traveling along a roadway with other autonomous vehicles. This Detailed Description section is divided into the following sub-sections: (i) The Hardware and Software Environment; (ii) Example Embodiment; (iii) Further Comments and/or Embodiments; and (iii) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
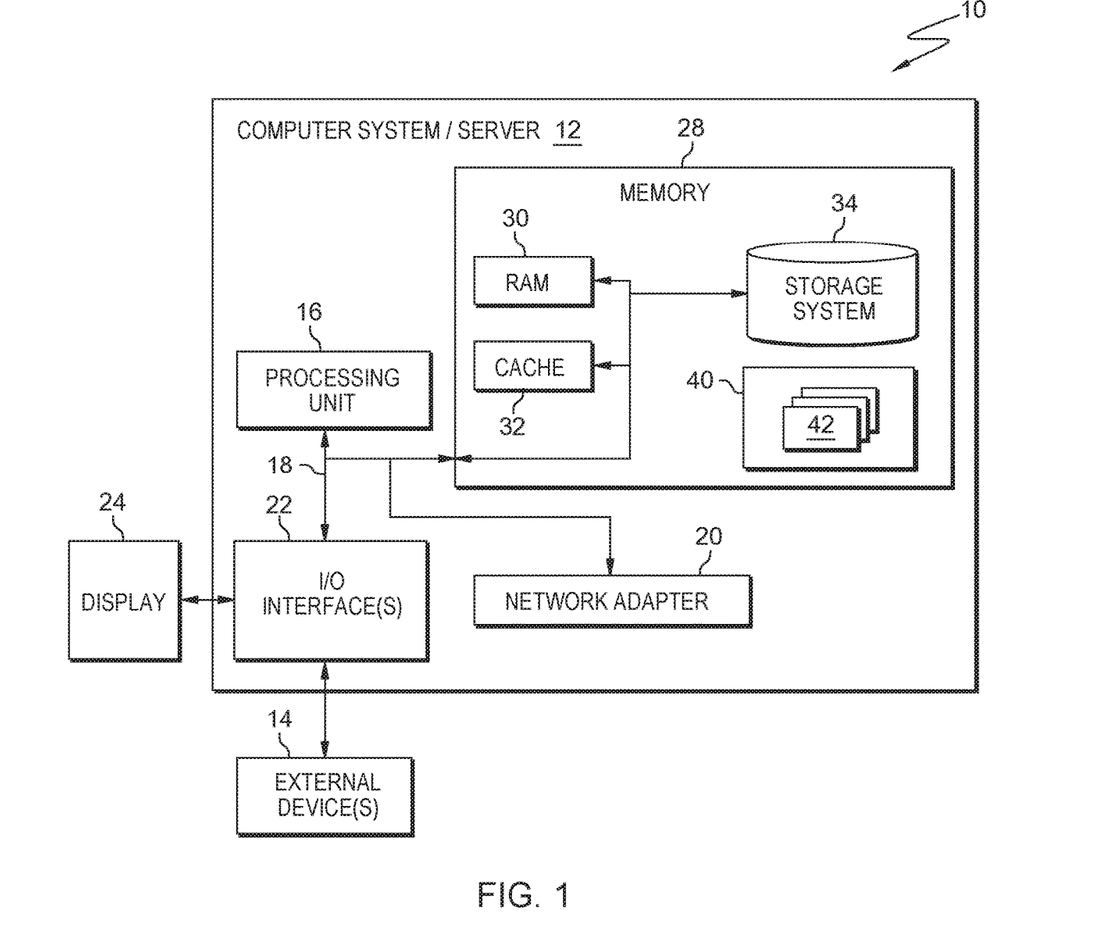
FIG. 1 depicts a cloud computing node used in a first embodiment of a system according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
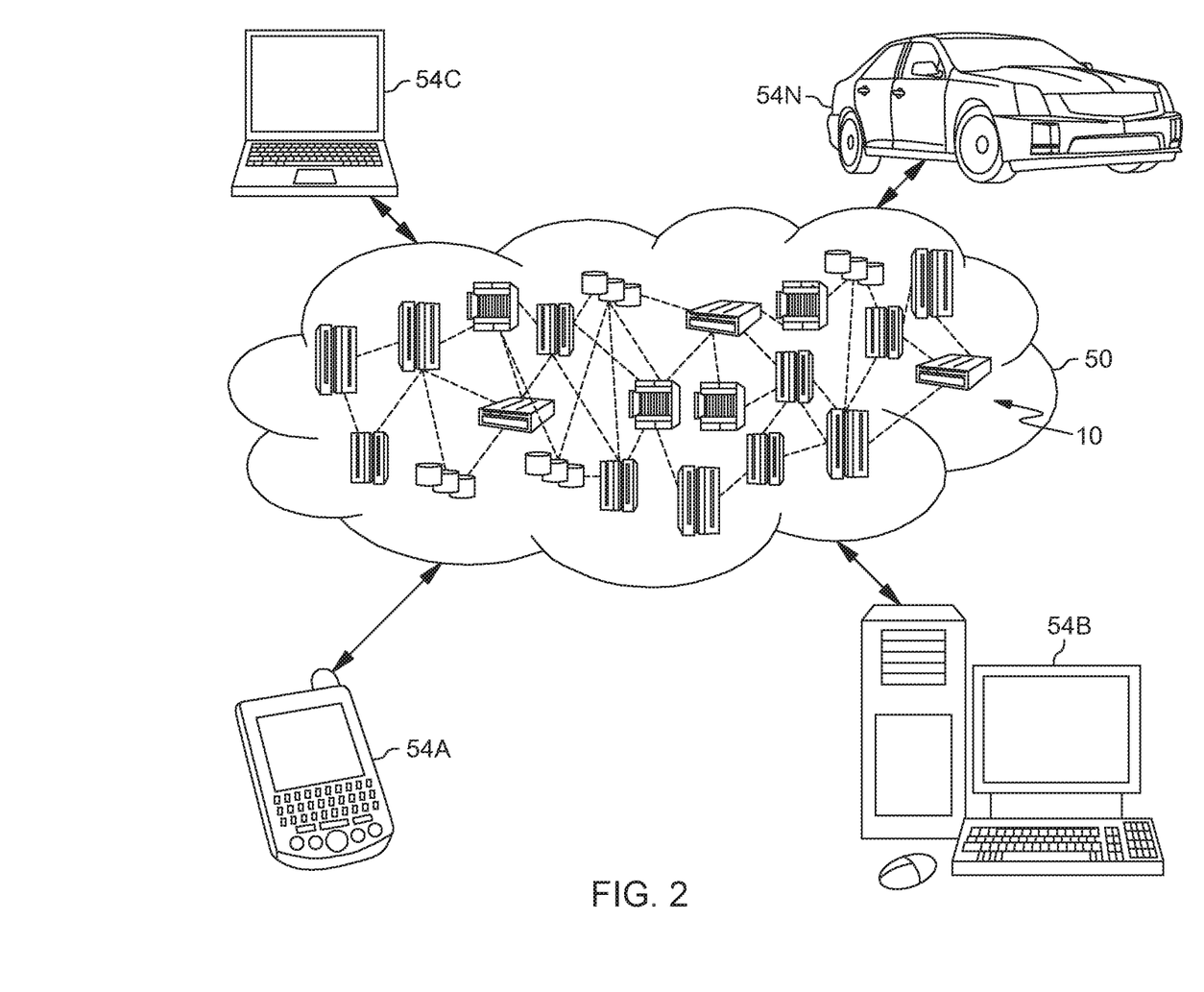
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
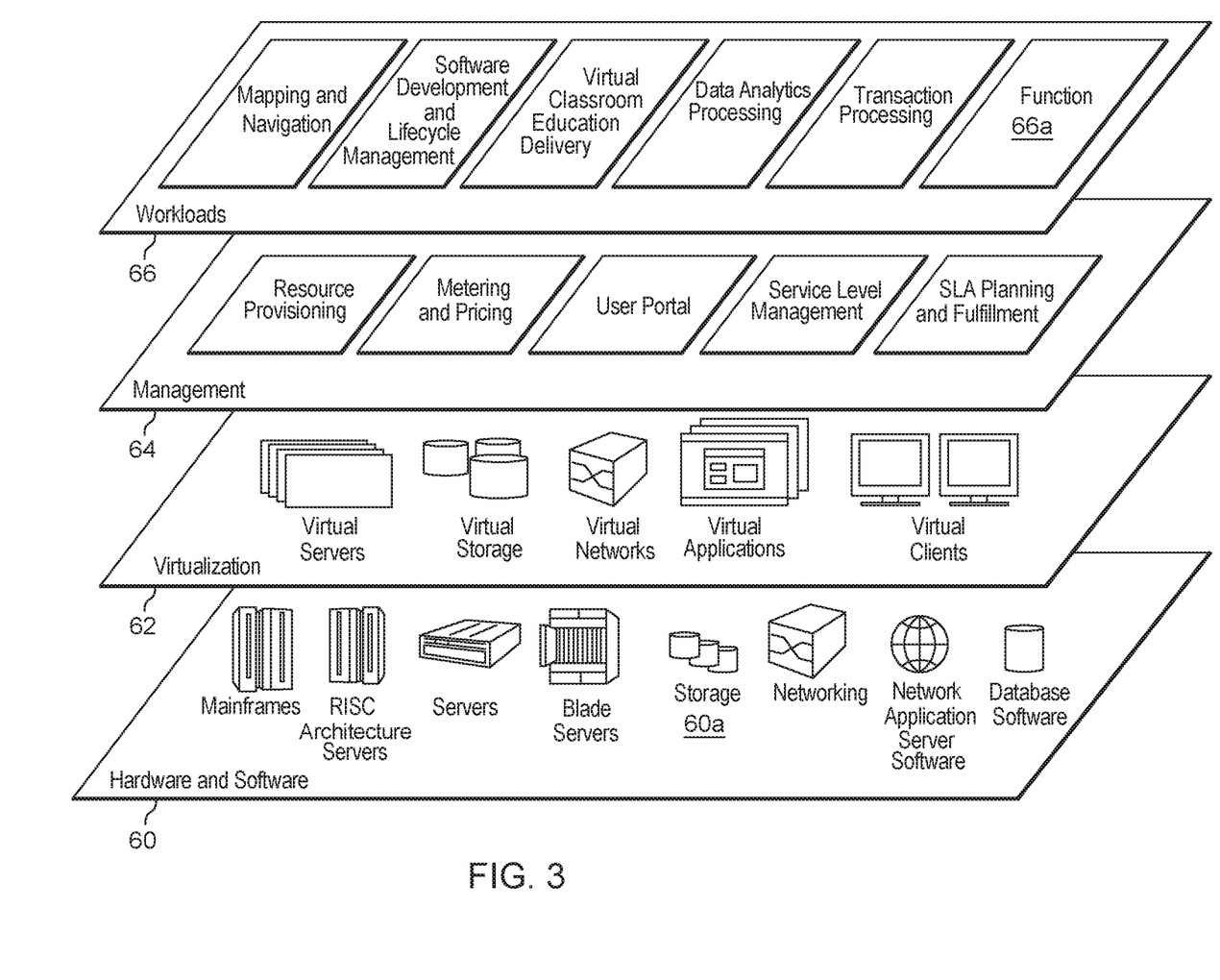
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
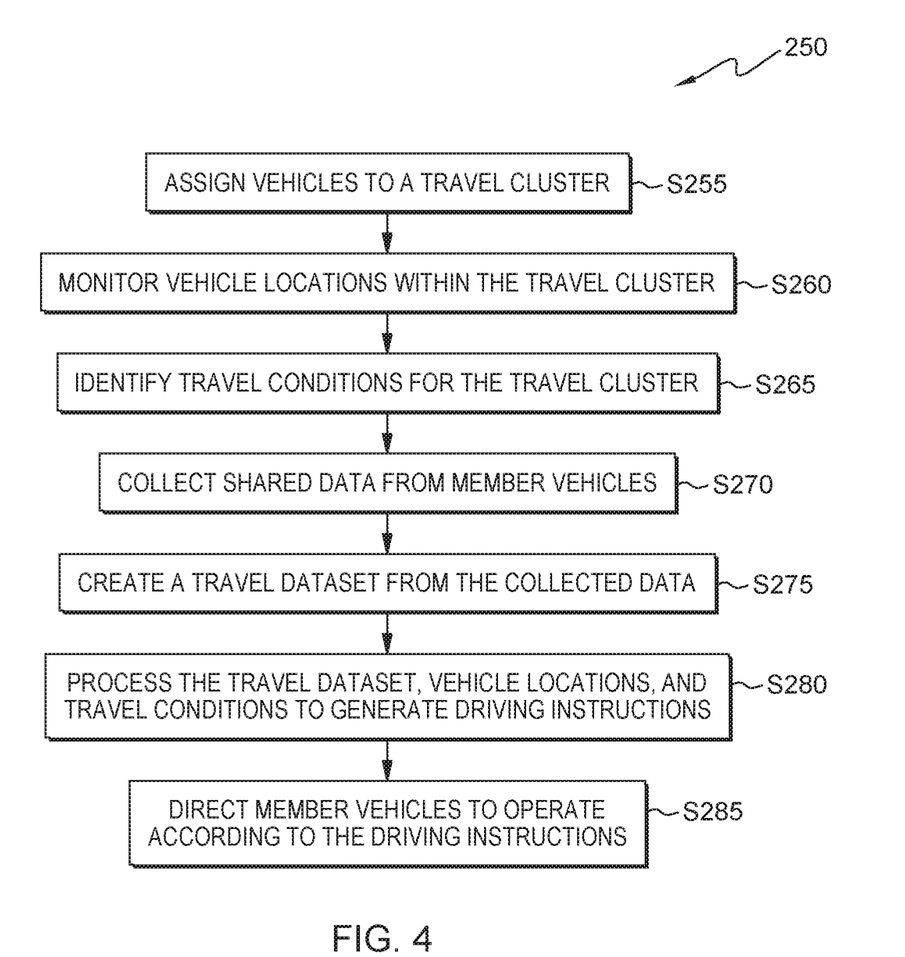
FIG. 4 is a flowchart showing a first embodiment method performed, at least in part, by the first embodiment system.
Figure 5:
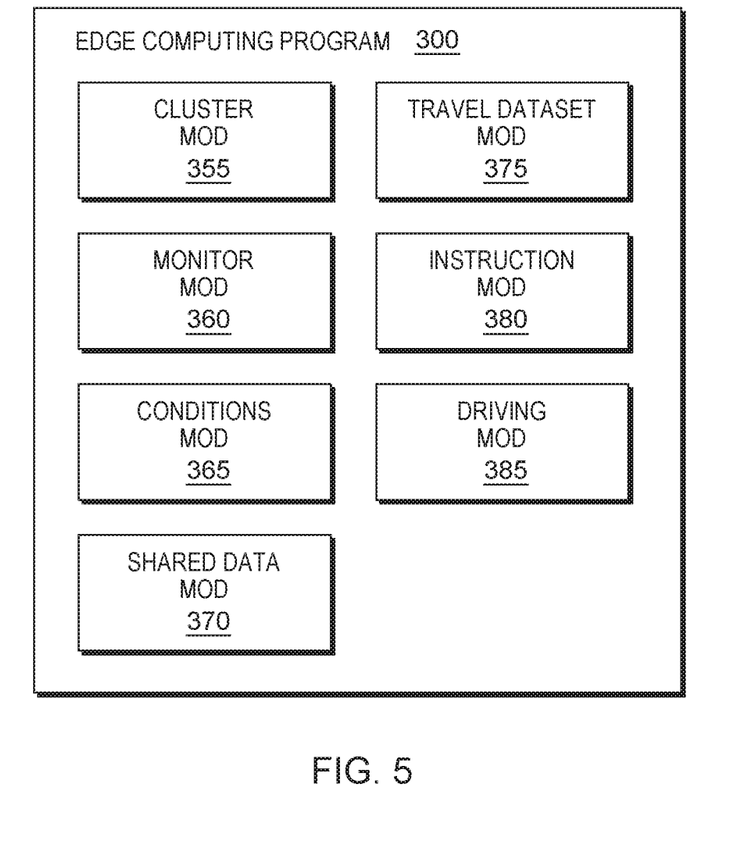
FIG. 5 is a block diagram showing a machine logic (for example, software) portion of the first embodiment system.

FIG. 4 shows flowchart 250 depicting a method according to the present invention. FIG. 5 shows program 300 for performing at least some of the method operations of flowchart 250. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60*a* (see FIG. 3).

Processing begins at step S255 where cluster module ("mod") 355 assigns vehicles to a travel cluster. Vehicles assigned to the travel cluster have certain characteristics making them amenable for being clustered with a reference vehicle. Roadways and traffic patterns on which the vehicles travel also have certain characteristics making them amenable for clustering vehicles. Characteristics of interest when assigning a vehicle to a cluster may include: (i) vehicle-to-vehicle network compatibility; (ii) data communication with a certain remote server; (iii) permission to participate in a travel cluster; (iv) distance from a reference vehicle within the travel cluster; (v) target destination; (vi) planned distance on a same trajectory with the travel cluster; (vii) number of vehicles present within communication range of a reference vehicle; (viii) condition of the road; (ix) lane characteristics of the road (divided highway, width of lanes, two-lane highway, etc.); (x) number of vehicles present on the road for a given distance; (xi) number of vehicles passing through a road segment over a given time period; (xi) direction of travel; (xii) velocity of the reference vehicle compared to other vehicles; (xiii) privacy settings; and/or (ix) the expected time that a given vehicle will remain close enough to a threshold number of vehicles, computed from its speed and navigation path. In this example, a reference vehicle within the travel cluster identifies potential vehicles to be added to the travel cluster and operates to assign selected vehicles to the cluster. Alternatively, a remote server performs the task of identifying potential cluster members and assigning certain vehicles to the travel cluster. The term member vehicle is used herein to refer to a vehicle that is a member of a given cluster.

The travel cluster operates in a networked vehicle system, such as a vehicle-to-vehicle network. Communication among vehicles is achieved over the network. In this example, when a vehicle is assigned to the travel cluster, the reference vehicle in the cluster sends driving instructions to the vehicle, controlling certain aspects of the operation of the vehicle including location, speed, and direction of travel. Alternatively, a remote server controls vehicle travel for the travel cluster, communicating with the reference vehicle to generate driving instructions.

Processing proceeds to step S260 where monitor mod 360 monitors vehicle locations within the travel cluster. In this example, the travel cluster includes an assigned reference vehicle that makes driving decisions locally on behalf of the travel cluster and communicates the decisions to the other vehicles. Vehicle locations within the cluster may be rearranged according to communication requirements. In this example, driving decisions are communicated to individual vehicles with respect to their location within an assigned cluster of vehicles. These driving decisions improve communications within the cluster, for example a vehicle may be directed to move closer to the reference vehicle by changing lanes in order to achieve a target communications reliability. Alternatively, driving decisions are made for individual vehicles to cause them to participate in a particular target cluster of vehicles, effectively transferring a vehicle from one cluster to another.

Each vehicle within a travel cluster communicates with other vehicles, or at least a reference vehicle over a network. In this example, the travel cluster includes an assigned reference vehicle that makes driving decisions locally on behalf of the travel cluster and communicates the decisions to the other vehicles. Alternatively, a remote server monitors vehicle location and makes driving decisions for the cluster.

Processing proceeds to step S265 where conditions mod 365 identifies travel conditions for the travel cluster. Travel conditions are often determined in real time by sensors and detection systems. Further, travel conditions may be determined by weather reports and communications with other traveling vehicles. Coordination of weather data may be performed locally at the reference vehicle or by a remote server. In this example, the reference vehicle identifies travel conditions locally, processing, as-available, inputs from various sources of travel condition data including data provided by intra-cluster communication over the vehicle-to-vehicle network. Alternatively, a remote server receives input data for identifying travel conditions for the vehicle cluster.

Processing proceeds to step S270 where shared data mod 370 collects shared data from vehicles in the travel cluster. Shared data is data made available to the vehicle cluster by a member vehicle. In this example, shared data supporting travel decisions including location, speed, and direction of travel is collected by the reference vehicle from the member vehicles. Data collected from onboard sensors and systems including cameras, traction sensors, and location systems are provided to the reference vehicle for processing. It should be noted that shared data may also be processed locally by a member vehicle to make driving decisions not delegated to the reference vehicle or to override certain driving decisions made by the reference vehicle. Alternatively, other combinations of sensor data and system data are collected for use by the reference vehicle. Alternatively, all data collected by the member vehicles is available to the reference vehicle for processing or for delivery to a remote server for processing.

Sources of shared data may include: (i) object sensors such as (a) ultrasonic sonars, (b) regular cameras, (c) laser scanners, (d) three-dimensional (3D) cameras, and (e) radars; (ii) pose sensors such as (a) wheel odometry sensors, (c) accelerometers, (d) gyroscopes, (e) mechanical tilt sensors, and (f) magnetic compasses; (iii) global positioning systems (GPS); (iv) inertial navigation systems; and/or (v) ground speed radar systems.

Processing proceeds to step S275 where travel dataset mod 375 creates a travel dataset from the collected data. In this example embodiment, the travel dataset is a deduplicated version of the collected shared data. Deduplication is performed by the reference vehicle prior to sending the data to the remote server for processing/decision making. Alternatively, the shared data is transmitted to the remote server where the shared data is deduplicated. Alternatively, only certain shared data is deduplicated, whether performed locally at the reference vehicle or performed by the remote server. The problem with shared data is that the various vehicles within the cluster may have duplicate sensors and may detect duplicate or repeated information from a same external source. For example, the camera data provided by one vehicle likely overlaps with camera data obtained by a neighboring vehicle within the cluster. Certain types of shared data are more likely to be reduced in size by deduplication efforts. In some embodiments, only certain shared data types are the target of deduplication.

Shared date is collected by vehicles within the cluster. These member vehicles, moving in the same direction along a roadway or other common trajectory, will collect information during the journey including: (i) nearby vehicles, (ii) obstacles in the road, (iii) sign board information, (iv) driving directions, (v) weather related information, (vi) information obtained from IOT (internet of things) sensors on the road, and/or (vii) the condition of road. A considerable portion of this collected information will be duplicated among member vehicles in cases where each member vehicle is collecting the data from the similar sensors.

Processing proceeds to step S280 where instructions mod 380 processes the travel dataset, the vehicle locations, and the travel conditions to generate driving instructions. In this example, the reference vehicle generates the travel dataset, identifies the vehicle locations within the cluster, and identifies travel conditions. This data is processed locally by the reference vehicle for making driving decisions in real time as the vehicles travel along a trajectory. The instructions mod generates instructions that will be followed by the reference vehicle as well as the member vehicles. Alternatively, the data obtained by the reference vehicle is transmitted to a remote server where the instructions module generates the driving instructions. Alternatively, the remote server identifies the vehicle locations and the travel conditions. In that way, the travel dataset and other data is combined at the remote server for generating driving instructions. In some embodiments, the travel dataset is generated by the remote server from the received shared data. In some embodiments, the travel dataset is provided to the remote server and added to the other identified information to generate driving instructions.

Processing proceeds to step S285 where driving mod 385 directs the vehicles of the travel cluster to operate according to the driving instructions. In this example, the reference vehicle instructs the member vehicles with the driving instructions as well as follows the driving instructions. Alternatively, the remote server directs the operation of the reference vehicle with the driving instructions. The reference vehicle in turn sends the driving instructions to the member vehicles. Alternatively, the remote server instructs each of the vehicles within a cluster according to the driving instructions.

Some embodiments of the present invention assign a first vehicle within a vehicle cluster to communicate with a remote server for processing travel data collected from onboard sensors and detection systems to generate driving instructions. An example process involves sending, by a first vehicle while traveling along a trajectory, first travel data from a first set of devices onboard the first vehicle to a remote server; detecting, by the first vehicle, a second vehicle located within a distance of the first vehicle, the second vehicle traveling along the trajectory and the second vehicle sending second travel data from a second set of devices onboard the second vehicle to the remote server; establishing communication between the first vehicle and the second vehicle over a vehicle-to-vehicle network; linking the second vehicle to the first vehicle to form a vehicle cluster traveling along the trajectory; causing the second vehicle to send the second travel data over the vehicle-to-vehicle network to the first vehicle; combining, by the first vehicle, the first travel data with the second travel data via a deduplication process, sending the deduplicated travel data to the remote server for processing, the remote server communicating driving instructions developed from the deduplicated travel data to the first vehicle; and the first vehicle relaying the driving instructions to the vehicle cluster including the second vehicle.

Some embodiments of the present invention are practiced in view of one or more of the following concepts: (i) processing of the data to make a "driving decision" may be performed by one vehicle, the reference vehicle in the cluster, instead of sending to a remote server to support or facilitate real-time decision making; (ii) vehicle to vehicle collaboration within the vehicle cluster over the V2V network; (iii) an optimum number of vehicles in a given cluster are dynamically identified in order to identify vehicles to be added to the cluster; (iv) sensors and systems on each vehicle in the cluster support identification of static or moving objects and obstacles and/or road conditions; (v) data collected includes info such as direction of movement and/or V2V connectivity capability; (vi) a remote server identifies the appropriate vehicles for the vehicle cluster and determines how closely the vehicles can be arranged together to reduce the amount of data duplication required; (vii) each vehicle in a cluster captures environmental data in such a way that duplicate data is not captured within the cluster; (viii) one vehicle in the cluster processes the collected data on behalf of the cluster of vehicles; (ix) the remote server monitors actual position, speed, direction of movement, and V2V connectivity capability of vehicles traveling along a same trajectory; (x) the remote server positions the vehicles within the cluster so as to collect the required data for the cluster and the collected data is processed by a reference vehicle within the cluster for making driving decisions for the cluster, operating as a single logical entity; (xi) constructing a cluster of vehicles by the remote server in view of context-aware minimum required distance between vehicles such as, taking into account width of lanes of the road, number of lanes of the road, and a communication range of the vehicles; (xii) collaboration is performed among clustered vehicles for data collection purposes and driving directions are provided by a remote server to the cluster of vehicles based on analysis of the collected data; (xiii) collaboration is a notion that may co-exist with a remote server in that the remote server assembles the clusters and causes the intracluster communications for making driving decisions locally at the reference vehicle on behalf of all vehicles in the cluster; and/or (xiv) individual vehicles may require that certain data be processed locally while turning over shared data to the reference vehicle in the cluster for cluster-based driving decisions.

III. Further Comments and/or Embodiments

Some embodiments of the present invention recognize the following facts, potential problems and/or potential areas for improvement with respect to the current state of the art: (i) there is a need to reduce server load and internet traffic created by controlling individual autonomous vehicles traveling over crowded roads; (ii) autonomous vehicles each capture surrounding data individually; (iii) the data collected by autonomous vehicles is processed by each vehicle individually; (iv) the data collected by autonomous vehicles is sent by the vehicle to a remote cloud server for processing; (v) driving decisions are taken based on the process data; (vi) autonomous cars having hundreds of on-vehicle sensors may generate around 40 TB of data for every eight hours of driving; (vii) it is unsafe, unnecessary, and impractical to send all of the vehicle-generated data to a remote cloud server; (viii) the particular set of data generated by autonomous vehicles has only a short-term value for controlling the vehicle at one particular moment; (ix) speed of actuation on generated data is paramount because of the short-term value of the data; (x) it is impractical and cost-prohibitive to transport vast volumes of data generated from each autonomous vehicle to a cloud computing environment; (xi) typically, the surrounding data collected by each autonomous vehicle is processed individually; and/or (xii) where surrounding data is processed by a remote server, duplicate data is transmitted by each vehicle to the remote server taking up more bandwidth than necessary if the surrounding data were deduplicated prior to transmission to the remote server.

Some embodiments of the present invention recognize that oftentimes each vehicle in a group travelling along a distance of road communicates surrounding data individually according to their slightly distinct fields of view for processing by a remote server. When each vehicle communicates the collected data to the same server or cloud computing system, the power consumption and de-duplication requirements are much higher than for a single vehicle or a set of vehicles having a single vehicle communicating the data collected by the set of vehicles.

Some embodiments of the present invention provide for edge computing to be performed by autonomous vehicles. Edge computing is enabled by vehicle clustering such that internet data load and traffic is reduced and driving decisions and/or guidance is provided to the vehicles more quickly. This is achieved by deduplication of data collected by autonomous vehicles traveling similar routes.

Some embodiments of the present invention are directed to server traffic over an internet connection for proximate autonomous vehicles via a clustered computing environment. Reduction of server load and internet traffic is made possible by edge computing concepts and data optimization using cluster technology.

In this scenario, if each one of a set of co-located vehicles is capturing the same surrounding data, then the amount of data multiplied by the number of vehicles, driving the amount of data to be relatively very high. Duplicate data would be processed by each co-located vehicle. If autonomous vehicles do not process the surrounding data together, the heavy de-duplication process and high power-consumption of the multiplied data load will be required to communicate with the co-located vehicles. When each vehicle processes data independent of other vehicles traveling along a same trajectory the power required for the numerous communication processes is large and may cause the receiving remote server to struggle with an extensive data deduplication effort to provide driving instructions to the vehicles. Further, if the co-located vehicles are processing their data individually, the aggregate power consumption is relatively large compared to a system of collaborative processing among the co-located vehicles.

Some embodiments of the present invention are directed to dynamic identification of vehicle cluster size so that power consumption during vehicle-to-vehicle communication and power consumption for surrounding data processing is managed.

Figure 6:
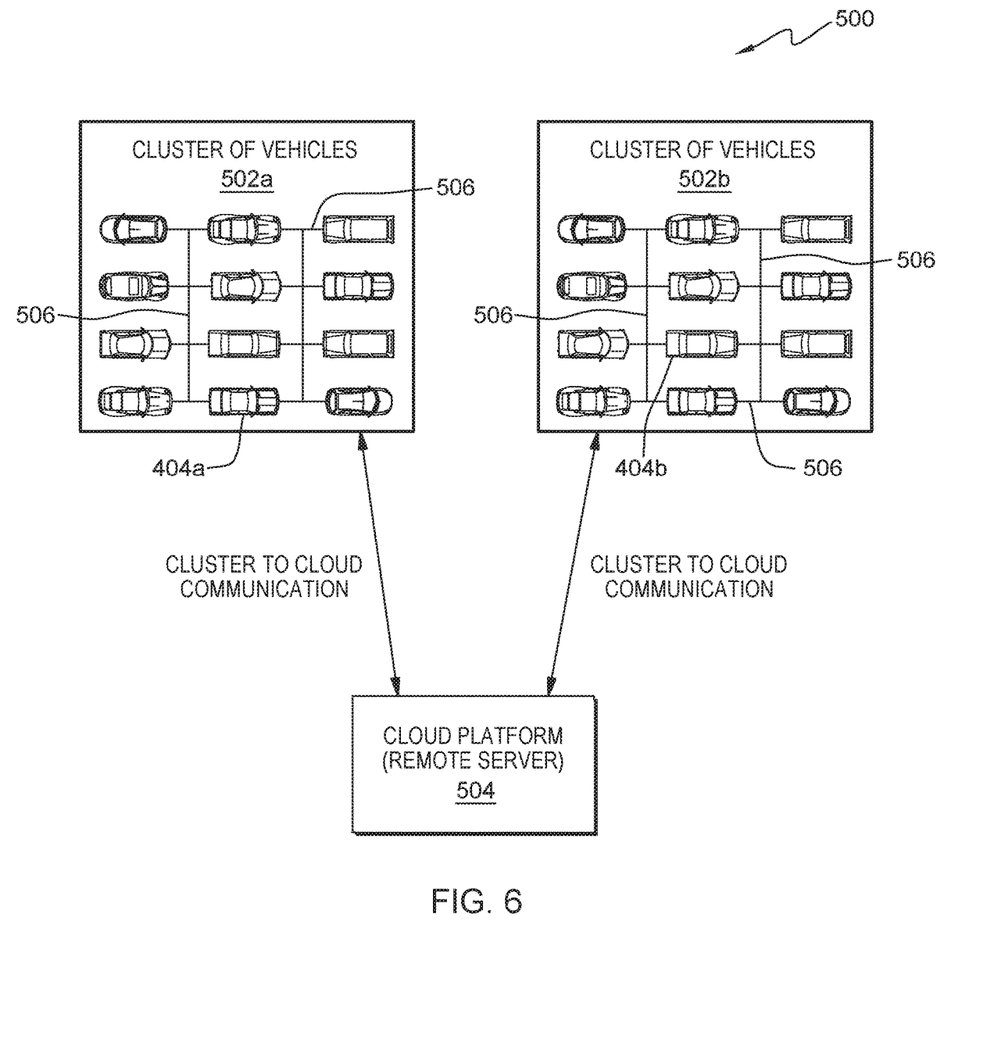
FIG. 6 is a block diagram of a second embodiment system according to the present invention.

FIG. 6 illustrates system architecture 500 of an embodiment of the present invention where clusters of vehicles 502a and 502b are organized such that single vehicles 404a and 404b belonging to each cluster communicates data to remote server 504 of a cloud platform. As shown in FIG. 6, the architecture relies upon intra-cluster communications 506 from member vehicles to a single representative vehicle such as 404a which, in turn, supplies the data to the remote server for processing for the cluster.

Figure 7:
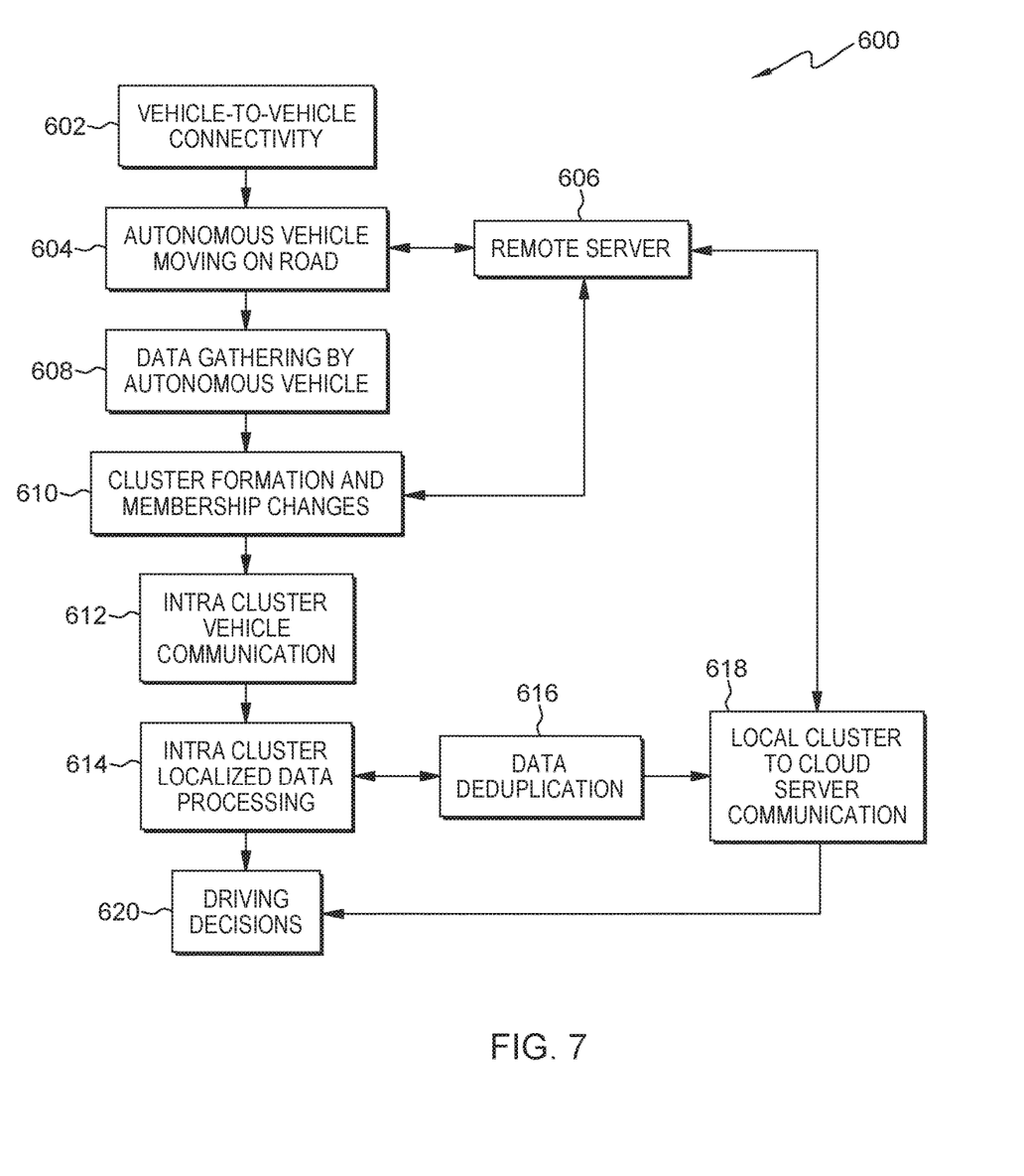
FIG. 7 is a flowchart of a second embodiment method according to the present invention that may be executed by the first embodiment system.

FIG. 7 is a flowchart for a method 600 according to an embodiment of the present invention. The method may be performed by the system of FIG. 6.

Processing begins with step 602 where a vehicle-to-vehicle network provides for connectivity between nearby autonomous vehicles. With reference to FIG. 6, vehicle-to-vehicle network 502a provides connectivity by intra-cluster communication fabric 506 to various member vehicles.

Processing proceeds to step 604 where an autonomous vehicle is identified as being within range of the vehicle-to-vehicle network and moving along a roadway common to other autonomous vehicles. In some embodiments, identification of the autonomous vehicle is achieved when the vehicle communicates with a remote server, identifying its current location. The server. determining that the vehicle is within range of a particular vehicle-to-vehicle network also in communication with the server, identifies the vehicle.

Processing proceeds to step 606, where a remote server is in electronic communication with the autonomous vehicle.

Processing proceeds to step 608 where surrounding data is collected by the autonomous vehicle for processing by the remote server.

Processing proceeds to step 610 where other autonomous vehicles are clustered with the autonomous vehicle to form a cluster of vehicles. Membership of the cluster is recorded by the remote server. In some embodiments, the remote server organizes and/or assigned various vehicle to various clusters according to target characteristics, such as distance from each other and direction and/or speed of travel.

When vehicles are clustered, processing proceeds to step 612, where the communication process performed by the autonomous vehicles changes to an intra-cluster communication such that a single reference vehicle within the cluster of vehicles continues to communicate with the remote server but the remaining vehicles communicate with the reference vehicle for driving instructions and transmission of data generated by sensors and system onboard the remaining vehicles.

Processing proceeds to step 614 where intra-cluster data received by the reference vehicle and surrounding data received by the reference vehicle are processed according to step 616, where data de-duplication reduces duplicative data collected intra-cluster by the several member vehicles and by the reference vehicle. Some embodiments of the present invention perform deduplication locally at the reference vehicle.

Processing proceeds to step 616, where the reference vehicle transmits the processed intra-cluster data and surrounding data to the remote server of a cloud environment. As stated above, the processed intra-cluster data is deduplicated. In some embodiments, the data is sent to the remote server for performance of the deduplication process.

Processing proceeds to step 620 where driving decisions are made with respect to navigating the autonomous vehicles within the cluster. The driving decisions are based on the localized data that is collected and deduplicated. In some embodiments, member vehicles make certain decisions independent of the cluster and rely upon the reference vehicle for making other decisions while traveling the roadway.

Formation of Clusters of Autonomous Vehicles

According to some embodiments of the present invention each autonomous vehicle in a given cluster of vehicles includes various sensors and a camera installed to capture surrounding environment so that autonomous vehicle can be directed by remotely provided driving decisions. The vehicle is capable of identifying static or moving objects and obstacles and road conditions.

If multiple vehicles are traveling in a same direction within close proximity, such as a 100 square foot range, then a majority of surrounding data will be duplicate, because, other vehicles within close proximity of the other vehicles moving in the same direction will capture the same data needed for receiving a driving decision. In that case duplicate data will be processed.

According to some embodiments of the present invention, a remote server identifies an appropriate vehicle moving in same direction as a primary vehicle and located within close proximity to the primary vehicle. In that way, the remote server calculates how closely the set of vehicles can be co-located within a single cluster so that duplicate data processing can be avoided.

Using GPS (global positioning system) positioning, the remote server determines a group of vehicles that should be moving together in a formal cluster so that duplicate data processing can be minimized and power required to communicate with each vehicle can be minimized. The vehicles in the cluster are each capturing similar sets of data in support of driving decisions such as direction of movement and vehicle-to-vehicle connectivity capability.

Figure 8:
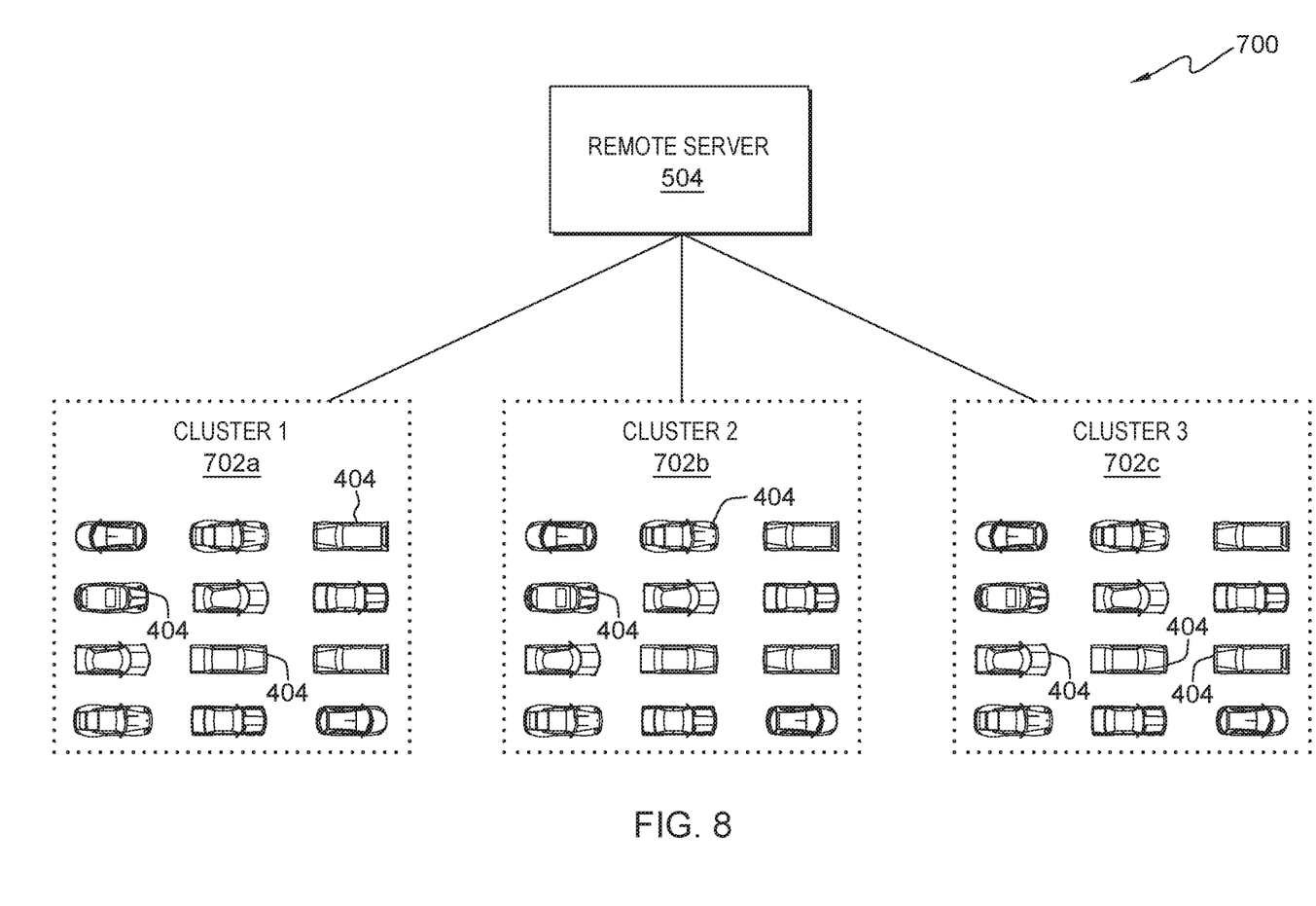
FIG. 8 is a block diagram of a third embodiment system according to the present invention.

FIG. 8 illustrates data collection environment 700 using multiple logical clusters 702a, 702b, and 702c to communicate with remote server 504, the clusters being created according to the number and proximity of autonomous vehicles 404 located on a roadway. The vehicles within each cluster can communicate with the other vehicles in the cluster so that power required for communication to the remote server is less than if each vehicle were communicating to the remote server. Each vehicle of any cluster captures data in a cooperative way such that duplicate data is not stored for transmission so that the total volume of data communicated is less than otherwise. Accordingly, one or more vehicles will be processing the gathered data. Having the optimum numbers of vehicles in each cluster will reduce the aggregated power consumption and real-time driving decisions can be taken by each cluster. Here each cluster is considered as a single logical entity for data processing purposes. Each vehicle 404 of each cluster 702a, 702b, and 702c gathers data individually, but computation is performed by only one vehicle of each cluster. In that way, processing time and the aggregate data processing activity is lower than if each vehicle communicated individually to the remote server.

With reference to FIG. 8, the distance between the first row and the last row of vehicles in each cluster may be reduced to improve communication and reduce the power necessary for intra-cluster communication. By carefully positioning vehicles in clusters, the wireless communication range may be optimized for vehicles within each cluster.

Cluster Communication and Dynamics

According to some embodiments of the present invention, each and every autonomous vehicle in a particular region will be identified by a remote server. In that case, the autonomous vehicles are also in communication with the remote server. Each autonomous vehicle communicates with other nearby autonomous vehicles (i.e. within communication range), but each autonomous vehicle has a limited communication range beyond which it cannot communicate with vehicles via vehicle-to-vehicle network connectivity. Autonomous vehicles share the connectivity capability range with the remote server. In that way, the remote server determines the actual position, speed, direction of movement, and vehicle-to-vehicle network connectivity capability of each autonomous vehicle in the particular region.

During any road condition, weather-related changes or construction interruption, such as the number of lanes being changed, the number of vehicles in each cluster and the relative position of the vehicles within the clusters may be changed dynamically to accommodate current road conditions. If any cluster of vehicles has the fewest vehicles, the remote server re-assigns vehicles in the clusters to make each cluster complete. Blockchain or other distributed, decentralized, public ledger technologies ensure data integrity and prevent malicious attempts to corrupt the data within the cluster. Data generated by multiple sources are examined during processing to identify mismatched information. If there is a mismatch, the datasets with the highest quorum value are accepted as the true data, while the remaining data is discarded or kept aside for further investigation for potential maliciousness.

Data Optimization Within Clusters

According to some embodiments of the present invention the remote server identifies the relative position of a vehicle with a real-time geographic position. Vehicles traveling proximate each other analyze similar datasets collected from the surrounding environment including physical objects, video feeds, and weather conditions. These similar datasets are considered to be duplicate data processed by each vehicle individually.

Some embodiments of the present invention are directed to collecting only certain dataset from certain vehicles within a given cluster. For each cluster of vehicles, a participating vehicle is positioned in such a way that it captures only certain required sets of data. In that way, the vehicles in each cluster collect data for different aspects necessary to instruct the vehicle to drive on the road. A cluster of vehicles is considered as single processing unit. Alternatively, datasets collected by each vehicle within a cluster are processed by a single vehicle within the cluster to remove duplicate data.

Some embodiments of the present invention are directed to co-located autonomous vehicles traveling on a same roadway. The vehicles collaborate with each other to identify a preferred number of vehicles and relative distance and position of each vehicle in a cluster of vehicles. The aggregated power consumption required to communicate with other vehicles in the cluster and to process data for driving decision support kept at a minimum. Further, the remote server uniquely identifies the clusters of vehicles and identifies the number of vehicles in each cluster. The remote server also identifies whether certain vehicles can be added to an incomplete cluster to make the cluster a full cluster. When making a full cluster, the remote server directs the required number of vehicles to join an incomplete cluster. By maintaining a full cluster, the power consumption is managed. For example, if any cluster of vehicles falls short by three vehicles, the remote server identifies the cluster requiring three more vehicles to be added and identifies the three vehicles that will be added in the cluster.

Some embodiments of the present invention take into consideration many factors when creating a cluster of autonomous vehicles including: (i) the number of vehicles present on the road; (ii) road condition; (iii) context aware minimum required distance between any pair of vehicles; (iv) width and/or number of lanes of the road; (v) vehicle-to-vehicle communication range of a vehicle; (vi) direction of the vehicle; and/or (vii) velocity of the vehicle. According to some embodiments of the present invention, the number of vehicles in each cluster and the distance between any pair of vehicles in the cluster is determined dynamically so that power consumption is optimized according to the current context. For example, a two-lane roadway becomes a four-lane roadway, or a new lane needs to be created for an emergency vehicle. In such cases, as the context changes, the cluster is rebuilt or restructured according to the change in context in which the cluster operates. For example, a forward vehicle can send a message to a rearward vehicle about a road hazard, such as a pothole or an obstacle, and the rearward vehicle can adjust its velocity or take a different path to avoid the road hazard.

Some embodiments of the present invention may include one, or more, of the following features, characteristics and/or advantages: (i) enables smooth travel for autonomous vehicles; (ii) enables efficient travel for autonomous vehicles; (iii) enables sustainable travel for autonomous vehicles; (iv) the data collected by member vehicles within the cluster can be used by other member vehicles to take real-time decisions locally for enabling efficient and smooth travel for autonomous vehicles; (v) considerable reduction in the network bandwidth usage and amount of data transfer between edge and remote server; (vi) promotes edge computing and its benefits for autonomous vehicle and in other relevant IoT areas; (vii) helps autonomous vehicles to take efficient and real time decisions; (viii) energy and processing power usage will be comparatively minimal; and/or (ix) the amount of battery power, processing power, and network bandwidth required for autonomous vehicles and the IoT (internet of things) sensors on autonomous vehicles should be reduced to a sustainable level.

III. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
assigning a set of vehicles to a first cluster, the set of vehicles traveling along a common trajectory;
assigning a data collection task to a first vehicle in the first cluster, the data collection task being to:
collect a first set of data from a set of sensors of the first vehicle; and
transmit the first set of data to a second vehicle;
collecting, by the second vehicle, a second set of data from onboard sensors of the second vehicle;
combining the first set of data with the second set of data to create a travel dataset;
performing analysis on the travel dataset to generate driving instructions; and
instructing vehicles in the first cluster, including the first vehicle and the second vehicle, to operate according to the driving instructions.

2. The computer-implemented method of claim 1 wherein the step of performing analysis includes:
transmitting the travel dataset to a remote server; and
receiving the driving instructions from the remote server.

3. The computer-implemented method of claim 1, further comprising:
identifying the first vehicle traveling within range of a vehicle-to-vehicle network associated with the second vehicle, the first vehicle having characteristics suitable to participate in the first cluster; and
establishing communication between the first vehicle and the second vehicle over the vehicle-to-vehicle network.

4. The computer-implemented method of claim 1, further comprising:
monitoring locations of the vehicles in the first cluster, the locations making up the physical configuration of the first cluster;
identifying a change in roadway characteristics at a location toward which the first cluster is moving; and
adjusting the physical configuration of cluster to accommodate the change in roadway characteristics by causing the first vehicle to move to another location within the first cluster.

5. The computer-implemented method of claim 1, wherein the step of combining the first set of data with the second set of data includes:

de-duplicating the combined first and second sets of data to create the travel dataset.

6. The computer-implemented method of claim 1, wherein the first set of data is a subset of all data collected by the first vehicle while traveling the common trajectory.

7. The computer-implemented method of claim 1, wherein the first vehicle is an autonomous vehicle and the set of sensors of the first vehicle generate data used by the first vehicle to travel the common trajectory.

8. The computer-implemented method of claim 1, further comprising:
monitoring cluster membership of the vehicles in a plurality of travel clusters, including the first cluster, traveling along a common trajectory;
determining the first cluster includes more vehicles than a second cluster of the plurality of travel clusters; and
responsive to determining the first cluster includes more vehicles than the second cluster, causing the first vehicle to move from the first cluster to the second cluster.

9. A computer program product comprising computer-readable storage media having collectively stored therein a set of instructions which, when executed by a processor, causes the processor to instruct a set of vehicles to take driving actions by:
assigning a set of vehicles to a travel cluster, the set of vehicles traveling along a common trajectory;
assigning a data collection task to a first vehicle in the travel cluster, the data collection task being to:
collect a first set of data from a set of sensors of the first vehicle; and
transmit the first set of data to a second vehicle;
collecting, by the second vehicle, a second set of data from onboard sensors of the second vehicle;
combining the first set of data with the second set of data to create a travel dataset;
performing analysis on the travel dataset to generate driving instructions; and
instructing vehicles in the travel cluster, including the first vehicle and the second vehicle, to operate according to the driving instructions.

10. The computer program product of claim 9, wherein the instructions which, when executed by the processor, cause the processor to perform analysis includes:
instructions to transmit the travel dataset to a remote server; and
instructions to receive the driving instructions from the remote server.

11. The computer program product of claim 9, further causing the processor to instruct a set of vehicles to take driving actions by:
identifying the first vehicle traveling within range of a vehicle-to-vehicle network associated with the second vehicle, the first vehicle having characteristics suitable to participate in the travel cluster; and
establishing communication between the first vehicle and the second vehicle over the vehicle-to-vehicle network.

12. The computer program product of claim 9, further causing the processor to instruct a set of vehicles to take driving actions by:
monitoring locations of the vehicles in the travel cluster, the locations making up the physical configuration of the travel cluster; and
adjusting the physical configuration of cluster by causing the first vehicle to move to another location within the travel cluster.

13. The computer program product of claim 8, wherein the instructions which, when executed by the processor, cause the processor to combine the first set of data with the second set of data includes:
instructions to de-duplicate the combined first and second sets of data to create the travel dataset.

14. The computer program product of claim 8, wherein the first vehicle is an autonomous vehicle and the set of sensors of the first vehicle generate data used by the first vehicle to travel the common trajectory.

15. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to instruct a set of vehicles to take driving actions by:
assigning a set of vehicles to a travel cluster, the set of vehicles traveling along a common trajectory;
assigning a data collection task to a first vehicle in the travel cluster, the data collection task being to:
collect a first set of data from a set of sensors of the first vehicle; and
transmit the first set of data to a second vehicle;
collecting, by the second vehicle, a second set of data from onboard sensors of the second vehicle;
combining the first set of data with the second set of data to create a travel dataset;
performing analysis on the travel dataset to generate driving instructions; and
instructing vehicles in the travel cluster, including the first vehicle and the second vehicle, to operate according to the driving instructions.

16. The computer system of claim 15, wherein the instructions which, when executed by the processor, cause the processor to perform analysis includes:
instructions to transmit the travel dataset to a remote server; and
instructions to receive the driving instructions from the remote server.

17. The computer system of claim 15, further causing the processor to instruct a set of vehicles to take driving actions by:
identifying the first vehicle traveling within range of a vehicle-to-vehicle network associated with the second vehicle, the first vehicle having characteristics suitable to participate in the travel cluster; and
establishing communication between the first vehicle and the second vehicle over the vehicle-to-vehicle network.

18. The computer system of claim 15, further causing the processor to instruct a set of vehicles to take driving actions by:
monitoring locations of the vehicles in the travel cluster, the locations making up the physical configuration of the travel cluster; and
adjusting the physical configuration of cluster by causing the first vehicle to move to another location within the travel cluster.

19. The computer system of claim 15, wherein the instructions which, when executed by the processor, cause the processor to combine the first set of data with the second set of data includes:
instructions to de-duplicate the combined first and second sets of data to create the travel dataset.

20. The computer system of claim 15, wherein the first set of data is a subset of all data collected by the first vehicle while traveling the common trajectory.

* * * * *